United States Patent [19]

Liles et al.

[11] Patent Number: 5,086,146
[45] Date of Patent: Feb. 4, 1992

[54] METHYLALKOXY-METHYLALKYL CYCLOSILOXANE COPOLYMER

[75] Inventors: Donald T. Liles, Midland; Renee A. Klein, Sanford, both of Mich.

[73] Assignee: Dow Corning Corporation, Midland, Mich.

[21] Appl. No.: 681,262

[22] Filed: Apr. 8, 1991

Related U.S. Application Data

[62] Division of Ser. No. 578,715, Sep. 7, 1990.

[51] Int. Cl.$^5$ ............................................. C08G 77/06
[52] U.S. Cl. ........................................ 528/15; 528/21; 528/28; 528/25; 556/460; 556/462; 556/482
[58] Field of Search ............... 556/460, 462, 482; 528/21, 28, 15, 25

[56] References Cited

U.S. PATENT DOCUMENTS

| | | | |
|---|---|---|---|
| 2,975,202 | 3/1961 | Mixer | 556/460 |
| 3,306,759 | 2/1967 | Steinbach | 106/287.16 |
| 4,497,943 | 2/1985 | Takago et al. | 556/460 |

*Primary Examiner*—Melvyn I. Marquis
*Attorney, Agent, or Firm*—Jim L. DeCesare

[57] ABSTRACT

A methylalkoxy-methylalkyl cyclosiloxane copolymer having the formula $$(OSiROR)_d(OSiRR')_e$$

where R is an alkyl radical having one to three carbon atoms; R' is the alkyl radical $(CH_2)_cR$; c is an integer having a value of from 1 to 17; d is an integer having a value of from 3 to 10; and e is an integer having a value of from one to seven.

3 Claims, No Drawings

METHYLALKOXY-METHYLALKYL CYCLOSILOXANE COPOLYMER

This is a division of copending application Ser. No. 578,715, filed Sept. 7, 1990.

BACKGROUND OF THE INVENTION

This invention relates to siloxane and siloxane copolymer masonry water repellent compositions, and more particularly is directed to a water repellent composition for treating porous substrates which is an emulsion including a copolymer such as a linear methylhydrogenmethylalkyl siloxane or a methylhydrogenmethylalkyl cyclosiloxane.

Water resistance is an important factor in concrete and masonry construction. This is for the reason that moisture movement in concrete causes or contributes to problems such as expansion, shrinkage, cracking, staining, mildew, lowered resistance to freezing and thawing, chemical attack, corrosion of reinforcing steel, and damage to structures from settling. Because of these problems, various techniques have been used to render concrete water resistant. Some of these methods include the surface treatment of concrete structures with water repellents. Water repellents that have been used in the past are oils, waxes, soaps, resins and organosilicon compounds, and they have been applied to the masonry surfaces by brush, roller, air spray, or airless spray techniques. One of the most prevalent category of repellent that has been used is organosilicon compounds, and such compounds in organic solvents have been found to be useful for brick, concrete, stucco, or terrazo surfaces.

It is not new in the art to employ organosilicon compounds for the treatment of masonry surfaces in order to render such surfaces water repellent. For example, in U.S. Pat. No. 3,772,065, issued Nov. 13, 1973, there is disclosed an impregnant which is an alcohol or hydrocarbon solution of alkyltrialkoxysilanes or oligomers thereof. In U.S. Pat. No. 3,849,357, issued Nov. 19, 1974, a composition is described which is a mixture of a water base paint, and the reaction product of an alkyltrialkoxysilane, an alkyl orthosilicate, and water. U.S. Pat. Nos. 3,389,206, issued Apr. 22, 1975, and 4,002,800, issued Jan. 11, 1977, there is disclosed a solution containing an alcohol or hydrocarbon solvent, an alkyltrialkoxysilane, and an additive. The additive is either an organofunctional silane such as aminopropyltriethoxysilane or an alcoholate such as butyl titanate. U.S. Pat. No. 3,914,476, issued Oct. 21, 1975, refers to an aqueous solution containing an alkali metal organosiliconate, and an aqueous soluble carbonate or bicarbonate. In U.S. Pat. No. 3,955,985, issued May 11, 1976, an aqueous solution is described containing an alkali metal organosiliconate, a miscible alcohol or ketone, and an organic complexing or chelating agent such as nitrilotriacetic acid.

U.S. Pat. No. 3,956,570, issued May 11, 1976, applies an aqueous solution of an alkali metal propysiliconate. Surfaces are contacted with water followed by treatment with a mixture of calcium hydroxide and butyltrimethoxysilane in ethyl alcohol in U.S. Pat. No. 4,073,972, issued Feb. 14, 1978. In U.S. Pat. No. 4,076,868, issued Feb. 28, 1978, there is applied a solvent solution thickened with a filler, and containing either (i) a polysiloxane having a viscosity less than 1000 cs, (ii) an alkyltrialkoxysilane, or (iii) an alkali metal hydrocarbon siliconate. U.S. Pat. No. 4,102,703, issued July 25, 1978, forms a stable suspension of hydrophobed metal oxides in ethylene glycol, and applies the suspension to masonry. Hydrophobing is accomplished with either (i) organohalosilanes, (ii) organosilylamines, (iii) cyclic organosilazanes, (iv) organocyclosiloxanes, (v) polyorganosiloxanes, (vi) alkylhydrogen silicone oils, or (vii) hydroxy endblocked polyorganosiloxanes.

In U.S. Pat. No. 4,209,432, issued June 24, 1980, the patentee applies a solvent solution containing a filler such as fume silica, and containing either (i) an organosiloxane having more than ten silicon atoms per molecule, (ii) an alkyltrialkoxysilane, (iii) the reaction product of a silane and ethylene glycol, or (iv) an alkali metal hydrocarbon siliconate. U.S. Pat. No. 4,273,813, issued June 16, 1981, employs a coating of an emulsion of an anionically stabilized hydroxy endblocked polydiorganosiloxane, amorphous silica, and an organic tin salt. In U.S. Pat. No. 4,342,796, issued Aug. 3, 1982, the patentee dries the surface to be treated, applies an alkyltrialkoxysilane to the dried surface, allows the silane to migrate into the surface, and applies water to the treated surface. U.S. Pat. No. 4,352,894, issued Oct. 5, 1982, applies an aqueous solution of an alkylsilanol prepared from propyltrimethoxysilane. A coating of a moisture curable urethane resin and an alkylpolysiloxane or hydroxyalkyl polysiloxane such as 2-ethyl-hexyl polysiloxane, stearyl polysiloxane, or hydroxyethyl polysiloxane, is disclosed in U.S. Pat. No. 4,413,102, issued Nov. 1, 1982. In U.S. Pat. No. 4,433,013, issued Feb. 21, 1984, there is applied an emulsion of an akyltrialkoxysilane including a deactivatable surfactant such as a fatty acid ester or silica ester. After the emulsion is applied, the surfactant is deactivated with water containing an alkaline or acid substance. U.S. Pat. No. 4,478,911, issued Oct. 23, 1984, relates to a coating which includes an alkyltrialkoxysilane, water, an organic solvent, and a catalyst such as an organic amine. In U.S. Pat. No. 4,486,476, issued Dec. 4, 1984, the patentee impregnates with a water immiscible solvent such as naphtha containing a mixture of a methyl-ethoxysiloxane having an ethoxy content of 12 percent and a methyl-ethoxysiloxane having an ethoxy content of 43 percent.

U.S. Pat. No. 4,631,207, issued Dec. 23, 1986, employs a solvent such as a glycol ether containing the reaction product of octamethylcyclotetrasiloxane and N-(2-aminoethyl)-3-aminopropyl dimethoxy-methylsilane. Reexamined U.S. Pat. No. B1 4,648,904, issued Mar. 10, 1987, is directed to an emulsion of an alkyltrialkoxysilane, an emulsifier having an HLB value of 2-20, and water. A solution containing an alkylalkoxy polysiloxane resin is applied to masonry in U.S. Pat. No. 4,717,599, issued Jan. 5, 1988. An oily composition or emulsion is disclosed in U.S. Pat. No. 4,741,773, issued May 3, 1988, containing a mixture of a silicone oil with either a nonvolatile paraffinic oil such as turbine oil or a nonvolatile low molecular weight hydrocarbon resin such as polybutene. In U.S. Pat. No. 4,753,977, issued June 28, 1988, the treating composition includes an organopolysiloxane resin, an alkylalkoxy polysiloxane resin, and a condensation catalyst. A sealer including a hydroxy-substituted polyorganosiloxane and a mixture containing (i) an aromatic solvent such as toluene, (ii) a chlorinated solvent such as trichloroethane, and (iii) an aliphatic solvent such as heptane, is taught in U.S. Pat. No. 4,786,531, issued Nov. 22, 1981.

In U.S. Pat. No. 4,846,886, issued July 11, 1989, and in U.S. Pat. No. 4,874,431, issued Oct. 17, 1989, the patentees apply a combination of (i) a carrier such as an alcohol, glycol ether, or mineral spirits, (ii) a metal salt catalyst, (iii) an alkylalkoxysilane, and (iv) a beading agent such as a fluorosilicone fluid, a polydimethylsiloxane fluid, a room temperature curable silicone rubber, an amine salt functional siloxane copolymer, or trimethylsilyl endcapped polysilicate. A buffered aqueous silane emulsion is disclosed in U.S. Pat. No. 4,877,654, issued Oct. 31, 1989, and U.S. Pat. No. 4,889,747, issued Dec. 26, 1989, containing a hydrolyzable silane, an emulsifier with an HLB value of 1.5-20, water, and a buffering agent.

As noted, it is not new to treat masonry surfaces with organosilicon compounds for the purpose of rendering the masonry water repellent. One category of organosilicon compound which has been used extensively is the alkoxysilane, and representative of such masonry treatments with alkoxysilanes can be found in U.S. Pat. No. 3,772,065, issued Nov. 13, 1973; U.S. Pat. No. 3,879,206, issued Apr. 22, 1975; U.S. Pat. No. 4,478,911, issued Oct. 23, 1984; U.S. Pat. No. 4,648,904, issued Mar. 10, 1987; U.S. Pat. No. 4,846,886, issued July 11, 1989; and U.S. Pat. No. 4,874,431, issued Oct. 17, 1989. Another category of organosilicon compound frequently used in masonry treatment is the siloxane. Representative of such masonry treatments with siloxanes can be found in U.S. Pat. No. 4,209,432, issued June 24, 1980; U.S. Pat. No. 4,342,796, issued Aug. 3, 1982; and U.S. Pat. No. 4,753,977, issued June 28, 1988. The present invention includes siloxanes in one embodiment and the siloxanes of that embodiment differ from the siloxane compositions of the prior art in the presence in the siloxane molecule of the silylidyne radical

This difference is significant as will be pointed out hereinafter.

SUMMARY OF THE INVENTION

This invention is directed to a water repellent composition for treating porous substrates with an aqueous emulsion containing a siloxane or siloxane copolymer. The siloxane may be either a linear methylhydrogen siloxane or a cyclic methylhydrogen siloxane. The siloxane copolymer is either a linear methylhydrogenmethylalkyl siloxane copolymer or a methylhydrogenmethylalkyl cyclosiloxane copolymer.

The invention is also directed to a method of producing on a porous substrate a water shedding surface coating by applying to the porous substrate a composition in the form of an emulsion formed by combining a siloxane with a surfactant and water for producing on the surface of the porous substrate a durable water shedding surface coating.

It is therefore an object of the present invention to chemically fix a water-repelling agent to a porous substrate such as concrete, limestone, and natural stone, in order to improve its resistance to the absorption of water as well as to impart to the surface thereof the ability to shed surface water.

It is a further object of the present invention to increase the density of a silicone matrix within a porous substrate such as concrete, limestone, and stone, in order to render the substrate water resistant, and at the same time provide it with the property of shedding surface waters.

It is also an object of the present invention to provide a penetrating masonry water repellent composition for porous substrates such as concrete and limestone as well as other non-reactive masonry surfaces in which the repellent not only renders the substrate resistant to water penetration but in addition hinders the ingress of water at the surface.

These and other objects, features, and advantages of the herein described invention will become more apparent from a consideration of the following detailed description thereof.

DETAILED DESCRIPTION OF THE INVENTION

Masonry water repellents including alkylalkoxysilanes impart water repellent properties to such porous substrates as concrete, mortar, and stone. Such repellents function in this fashion because of the fact that they penetrate into the masonry prior to the time that they are transformed into immobile resinous materials. However, due to the penetration of the repellent into the porous substrate, the repellent does not leave behind much of a layer on the porous substrate. As a result, the repellent, though effective to render the substrate water resistant fails nevertheless to provide the substrate with coatings of any significant durability. The compositions disclosed herein are intended to overcome this deficiency and there can be achieved a good degree of water shedding function of the masonry structure because of polymer deposition on the surface of the masonry, in addition to the penetration of the repellent formulation to provide a deep section water barrier to water migration within the substrate itself.

The penetrating masonry water repellents of the present invention have particular application to the highway industry where water resistance is required for bridge decks, roads, and parking garages. In addition, such compositions are applicable especially to the building industry which makes use of masonry materials for walls such as natural stones which are porous and contain neutral mineral components including, for example, limestone, marble, and granite. These heretofore difficult to treat building materials can be effectively rendered water resistant with the compositions of the present invention. While the highway industry applications of the formulations will be primarily concrete, the building industry applications of the formulations can range from brick, natural stone, as noted above, cinder block, and stucco.

Generally, concrete, brick, and stucco, may be treated with an alkylalkoxysilane rendering the substrate water resistant. The latent alkalinity of such substrates promotes the hydrolysis and condensation of the silane into a resinous silicone matrix being permanently formed and deposited within the interior of the concrete, brick, or stucco substrate. Natural stone, such as limestone, is an exception in that it is relatively neutral and possesses no latent catalytic activity. As a consequence, the silane will not convert to a silicone as rapidly, nor will it affix itself to the calcareous interior surfaces of the substrate. The result is that there is provided very little or no water repellency or resistance to water absorption. This lack of reactivity of limestone is particularly noticeable when limestone aggregate is employed as a constituent in the preparation of concrete. In such instance, water readily penetrates along the interfacial boundaries between the concrete and the course limestone aggregate. Since the silane-based repellent does not adhere to the limestone, those portions of the concrete adjacent the aggregate are not rendered water resistant whereas the remainder of the concrete substrate is treated successfully. The water takes the path of least resistance into the mass of concrete, therefore, migrating along the side or through the aggregate of limestone particles. It is for these types of situations that certain embodiments of the present invention are particularly useful along with their capacity to shed water at the surface of the substrate.

The masonry water repellent compositions of the present invention including their capability of water shedding have wide application including for example, concrete products such as precast products, blocks, brick, pipe, prestressed products, structural concrete, and highway surfacing; floor and wall tiles, roofing tile, and structural tiles; in Portland cement concrete work containing coarse limestone aggregate as footings, poured foundations, paving, steps, curbs, structural products, molded, reinforced, and prestressed concrete products such as blocks, bricks, pipes, panels, and beams; exterior and interior plaster; stucco; and terrazo.

A major advantage of the repellent compositions of the present invention is that the compositions are capable of being formulated into a form which complies with various state and federal regulations regarding volatile organic content (VOC). These regulations generally prohibit a volatile organic content for an architectural coating which is in excess of about four hundred grams per liter. In the case of the compositions of the present invention, no volatile component is liberated from the reaction of the penetrant with concrete. Prior art solvent based alkoxysilanes on the other hand, liberate alcohol which is a volatile organic compound.

Accordingly, a penetrant can be formulated with the compositions of the present invention which complies with the volatile organic content regulations. Thus, a penetrant in accordance with the present invention will have a volatile organic content generally less than about four hundred grams per liter. In contrast, equivalent penetrants of the prior art which contain alkoxysilanes such as isobutyltrimethoxysilane have volatile organic contents of the order of magnitude of about 650-700 grams per liter.

The water repellent composition for treating porous substrates in accordance with the present invention is an emulsion containing water, at least one surfactant, and a siloxane which is either a linear methylhydrogen siloxane, a methylhydrogen-methylalkyl siloxane copolymer, a methylhydrogen cyclosiloxane, or a methylhydrogen-methylalkyl cyclosiloxane copolymer. The siloxane has the formula selected from the group consisting of

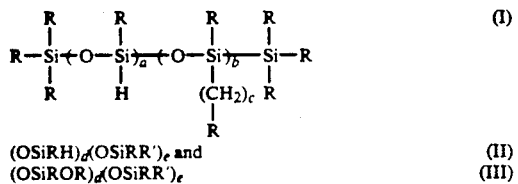

$(OSiRH)_d(OSiRR')_e$ and (II)
$(OSiROR)_d(OSiRR')_e$ (III)

where R is an alkyl radical having one to three carbon atoms; R' is the alkyl radical $(CH_2)_cR$; a is an integer having a value of from 3 to 35; b is an integer having a value of from zero to 32; c is an integer having a value of from one to seventeen; d is an integer having a value of from 3 to 10; and e is an integer having a value of from zero to seven. Formulas I and II cover a first embodiment, whereas Formula III relates to an alternate form of the invention.

The emulsion can include from about twenty to about sixty percent by weight of the siloxane, and preferably the emulsion includes forty to fifty percent by weight of the siloxane. Preferably, the integer a has a value of three or four; the integer b has a value of two or three; the integer c has a value of five, six, or seven; the integer d has a value of three or four; and the integer e has a value of one or two.

The following examples are set forth for the purpose of illustrating the basic concepts of the present invention including the method of preparing the siloxane copolymers of the present invention.

EXAMPLE I

In a 250 ml round bottom flask equipped with a reflux condenser and a heating mantle was placed a solution of 48 g of $(OSiMeH)_4$ and 16.8 g of 1-hexene. One piece of 8 mesh 0.5% Pt/C of 40 mg total weight, or about 0.2 mg Pt. was added to the solution and the contents of the flask were heated to reflux. An exotherm occurred during heating for about 10 minutes. The mixture was heated at reflux for an additional 15 minutes, after which it was allowed to cool to room temperature. Fourier Transform Infrared Analysis of an alliquot of the mixture revealed the presence of SiH and the absence of olefin. Gas chromatography/mass spectrometry analysis revealed the product to be a mixture having the following composition:

| | |
|---|---|
| $(OSiMeH)_4$ | 15% |
| $(OSiMeH)_3/(OSiMeC_6H_{13})$ | 50% |
| $(OSiMeH)_2/(OSiMeC_6H_{13})_2$ | 25% |
| $(OSiMeH)/(OSiMeC_6H_{13})_3$ | 10% |

EXAMPLE II

Following the same procedure of Example I, a mixture of 75 g of $Me_3Si-(OSiMe_2)_3(OSiMeH)_5-OSiMe_3)$ and 18.4 g of 1-hexene was allowed to react in the presence of 0.2 mg Pt as 0.5% Pt/C.

EXAMPLE III

A solution of 333 g of $(OSiMeH)_4$ and 210 g of 1-dodecene $(C_{12}H_{24})$ was prepared by weighing the two compounds into a 1 liter bottle and stirring the contents for 1 minute. 100 g of this solution was placed into a 1 liter round bottom flask equipped with a reflux condenser and a heating mantle. Two pieces of 8 mesh 0.5% Pt on C (0.2 mg Pt each) were added to the flask and the mixture was heated to boiling. The remainder of the solution was poured into a 500 ml dropping funnel, which was placed near the top opening of the reflux condenser. When the mixture in the flask started to boil, solution from the dropping funnel was added slowly through the reflux condenser. The fresh solution was added to the mixture at such a rate so as to maintain a gentle reflux in the flask. Addition of the solution in the dropping funnel required about 45 minutes. After all of the solution had been added, the mixture in the flask was heated at reflux for an additional 15 minutes, after which it was allowed to cool to room temperature and filtered through diatomaceous earth.

The reaction scheme for the process of preparing and using the composition of Example I can be seen as follows:

$$(OSiMeH)_4 + C_6H_{12} \xrightarrow{Pt/C} (OSiMeH)_3(OSiMeC_6H_{13})$$

Thus, methylhydrogen cyclosiloxane is reacted with the olefin 1-hexene in the presence of a platinum-carbon catalyst to produce a low molecular weight siloxane penetrant having alkylmethylsiloxy and organohydrosiloxy groups. When applied to concrete, for example, the low molecular weight siloxane penetrant having alkylmethylsiloxy and organohydrosiloxy groups of the formula $(OSiMeH)_{0.75}$ $(OSiMeC_6H_{13})_{0.25}$ is converted by hydrolysis and subsequent condensation to a copolymeric silicone resin of the formula $(MeSiO_{3/2})_{0.75}(OSiMeC_6H_{13})_{0.25}$. This resin is present on the surface and in the pores of the concrete, and renders it resistant to water.

This hydrosilylation reaction of the olefin with a low molecular weight methylhydrogen siloxane does not usually produce a pure compound, but a mixture of compounds is produced, and this mixture is used as the waterproofing penetrant. It is not necessary to use pure compounds as penetrants, since upon application to concrete, the penetrant hydrolyzes and condenses to form a silicone resin.

As previously noted, the compositions of the first embodiment of the present invention differ from the siloxane compositions of the prior art in the presence in the siloxane molecule of the silylidyne radical

$$-\overset{|}{\underset{|}{Si}}H.$$

This difference is significant since the silylidyne radical reacts with the hydroxide groups and moisture in the masonry substrate to form the copolymeric silicone resin described above. This resin is formed within the pores of the masonry substrate to which the repellent composition is applied. The copolymeric silicone resin that is formed within the masonry substrate pores is hydrophobic and therefore readily resists the permeation of water onto and into the porous surface and interior of the masonry material. The compositions of the first embodiment of the present invention have a relatively low viscosity and therefore are capable of diffusing and penetrating into porous masonry substrates to which they are applied. When applied to a masonry substrate such as concrete, for example, the latent alkalinity of the concrete catalyzes the reactions of water and hydroxide groups with the silylidyne radical to produce SiOH and hydrogen. The alkaline concrete further catalyzes the condensation of SiOH groups to produce siloxane bonds and water, and a resinous structure is ultimately produced.

As noted above, the repellent compositions of the present invention are capable of being formulated into coatings which comply with various state and federal regulations regarding volatile organic content (VOC). These regulations prohibit a volatile organic content architectural coating in excess of four hundred grams per liter. In the first embodiment of the present invention, the volatile component liberated from the reaction of the penetrant with concrete is hydrogen which is not a volatile organic compound. In the alternate embodiment of the present invention, even the liberated hydrogen can be eliminated by the replacement of SiH with alkoxy using an amine catalyst. Prior art alkoxysilanes on the other hand, liberate alcohol which is a volatile organic compound.

Accordingly, a penetrant can be formulated with the compositions of the present invention which complies with the volatile organic content regulations. Thus, a penetrant in accordance with the present invention containing about forty-five to about fifty percent by weight solids will have a volatile organic content less than about four hundred grams per liter. Penetrants of the prior art which contain alkoxysilanes such as isobutyltrimethoxysilane have volatile organic contents about 650-700 grams per liter.

Although the alkyl group of the siloxanes described in the present invention contribute to the ability of the compound to render concrete hydrophobic, its presence is not always required. Thus, methylhydrogen siloxane may be used to waterproof concrete, and the resulting silicone resin formed after complete hydrolysis and condensation is monmethylsilsequioxane or $MeSiO_{3/2}$. This material is substantially hydrophobic and readily renders concrete hydrophobic. However, there are advantages in using an alkylmethyl/methylhydrogen copolymeric material in lieu of the methylhydrogen siloxane. Thus, the olefins used to prepare alkylmethylsiloxane/methylhydrogen copolymers are less expensive than methylhydrogen siloxane from which these copolymeric materials are prepared. Hence material expense for alkylmethyl/methylhydrogen copolymeric compounds is less than methylhydrogen siloxane because the former is essentially the latter diluted with olefin. Even though the copolymeric materials require more processing than methylhydrogen siloxane, expense of the alkylmethylsiloxane/methylhydrogen copolymer are still lower than methylhydrogen siloxane. The copolymer also is less volatile and has a higher flash point than methylhydrogen siloxane.

The following additional examples illustrate details in the process for preparing the low volatile organic content emulsion coating compositions of the first embodiment of the instant invention.

The preferred starting material is a methylhydrogencyclosiloxane such as $(OSiMeH)_4$. However, mixtures of these cyclic siloxanes are as effective as the pure cyclic compound. The preferred olefin is 1-hexene. Other olefins include 1-pentene, 1-heptene, 1-octene, 1-decene or 1-dodecene. Mixtures of these olefins can also be used to make the compositions. The ratio of SiH to olefin can be varied, but this ratio should be such that a minimum of three SiH groups per molecule is retained. For example, if pure $(OSiMeH)_4$ is used, no more then one mole of olefin should be used per mole of cyclosiloxane. The method of hydrosilylation uses a heterogenous catalyst such as 0.5 % Pt/C. A mixture of the SiH compound, olefin and catalyst is heated to reflux for approximately 30 minutes. If the batch size is large, it is advisable to reflux a small portion of the mixture while adding the remainder in small increments to control the highly exothermic reaction. The product from this reaction, a low viscosity oil, is a mixture of compounds having an average stoichiometry of $(OSiMeH)_{0.75}/(OSiMeR)_{0.25}$ wherein $R=Me$, $C_6H_{13}$, or $C_{12}H_{23}$.

The low viscosity oil is homogenized with water and a surfactant to produce an oil in water nonionic emulsion having a solids content of about 30 percent by weight. As long as the pH of the emulsion is near neutral, hydrolysis of SiH is insignificant. When applied to a substrate, water evaporates to leave a low viscosity oil which diffuses and penetrates. When the substrate is alkaline, such as concrete, this alkalinity will catalyze reactions of hydrolysis/condensation. Specifically, SiH reacts with moisture and hydroxyls present in the substrate to produce $SiOH + H_2$. SiOH condenses to produce siloxane $+ H_2O$. Since the silicone oil is multifunctional, a resinuous structure will be formed with complete hydrolysis/condensation. This resin, being highly hydrophobic, waterproofs the substrate.

EXAMPLE IV

A solution of 300 g of $(OSiMeH)_4$ and 105 g of 1-hexene $(C_{12}H_{24})$ was prepared by weighing the two compounds into a one liter bottle and stirring the contents for one minute. 100 Grams of this solution was placed into a one liter round bottom flask equipped with a reflux condenser and a heating mantle. Two pieces of eight mesh 0.5% Pt on Carbon (0.2 mg Pt each) were added to the flask and the mixture was heated to boiling. The remainder of the solution was poured into a 500 ml dropping funnel which was placed near the upper opening of the reflux condenser. When the mixture in the flask started to boil, solution from the dropping funnel was added slowly through the reflux condenser. The fresh solution was added to the mixture at such a rate so as to maintain a gentle reflux in the flask. Addition of the solution in the dropping funnel required about 30 minutes. After all of the solution had been added, the mixture in the flask was heated at reflux for an additional 20 minutes, after which it was allowed to cool to room temperature and filtered through diatomaceous earth. FTIR analysis revealed the presence of SiH and the absence of olefin.

To 300 grams of this product was added 6 grams of the nonionic surfactant TERGITOL® TMN-6 and 694 grams of distilled water. The mixture was stirred for 30 minutes and homogenized using a Gaulin laboratory homogenizer to produce an oil in water emulsion having a solids content of about 30 percent by weight. With the same procedure, $(OSiMeH)_4$ was partially reacted with 1-dodecene using one mole of olefin to one mole of $(OSiMeH)_4$ and the product was homogenized to obtain a 30% solids emulsion. $(OSiMeH)_4$ was also emulsified using the above procedure to produce a 30% solids emulsion. 200 grams portions of the three emulsions were diluted with water to produce emulsions having a solids content of 15% by weight. The 15% solids emulsions and the 30% solids emulsions were used to treat $3'' \times 5'' \times 1''$ concrete blocks, and the block were tested for water repellency according to the method described in the National Cooperative Highway Research Program Report 244, Transportation Research Board, December, 1981, D.W. Pfeiffer & M.J. Scali; Wiss, Janney, Elstner & Associates. The test results are shown in Tables I and II.

While a nonionic surfactant is shown in Example IV, other types of surfactants can be employed in accordance with the present invention. Thus, the emulsions of the present invention can be formulated with nonionic, cationic, or amphoteric surfactants and mixtures thereof. The emulsions may also contain additives such as freeze-thaw compositions such as polyglycols, representative of which are ethylene glycol, propylene glycol, butylene glycol, mixtures, and copolymers thereof. Other techniques for preparing the emulsions of the present invention are applicable, for example as shown in U.S. Pat. No. 4,620,878, issued Nov. 4, 1986. The '878 patent also contains details of other suitable surfactants that may also be employed. Reference can also be made to the emulsion techniques and surfactants contained in U.S. Pat. No. 4,501,619, issued Feb. 26, 1985; U.S. Pat. No. 4,631,273, issued Dec. 23, 1986; and U.S. Pat. No. 4,842,766, issued June 27, 1989. These four patents are considered incorporated herein by reference. It is noted that the nonionic surfactant of Example IV in an ethoxylated trimethylnonanol with an HLB value of 11.7, and is a trademark and product of Union Carbide Corporation, Industrial Chemicals Division, Danbury, Conn.

TABLE I

Performance of 15% Solids $(OSiMeH)_{0.75}(OSiMeR)_{0.25}$ as Waterproofing Penetrants on Concrete

| | % $H_2O$ Exclusion | | | |
|---|---|---|---|---|
| R | 1 Day | 2 Days | 7 Days | 21 Days |
| H | Fail | Fail | Fail | Fail |
| $C_6H_{13}$ | 81 | 73 | 53 | 36 |
| $C_{12}H_{25}$ | 57 | 36 | Fail | Fail |

TABLE II

Performance of 30% Solids $(OSiMeH)_{0.75}(OSiMeR)_{0.25}$ as Waterproofing Penetrants on Concrete

| | % $H_2O$ Exclusion | | | |
|---|---|---|---|---|
| R | 1 Day | 2 Days | 7 Days | 21 Days |
| H | Fail | Fail | Fail | Fail |
| $C_6H_{13}$ | 90 | 87 | 77 | 71 |
| $C_{12}H_{25}$ | 85 | 78 | 54 | 27 |

In the alternate embodiment of the present invention and in the following examples, hydrogen on silicon is replaced with alkoxy by reaction with an alcohol using hydroxylamine catalyst. The reaction proceeds readily and can be controlled by the amount of catalyst used, the preferred level being 0.25 percent based on the weight of siloxane. In this reaction, SiH reacts with hydroxylamine to form O-aminoxysiloxane plus hydrogen. Alcohol reacts with aminoxysiloxane to form alkoxysiloxane plus hydroxylamine. The process repeats until all of the SiH is exhausted. The product from this reaction, a low viscosity oil, is a mixture of compounds having an average stoichiometry of $(OSiMeOR)_{0.75}/(OSiMeC_6H_{13})_{0.25}$ where R=Me, Et, or isopropyl. Although this emulsion contains alkoxy on silicon which is hydrolyzable, hydrolysis did not occur after four months of storage. The reason is believed to be due to the presence of only one alkoxy group per silicon atom. Emulsions of alkoxysilanes which are less stable have more alkoxy groups per silicone atom than these compositions. In addition, the pH of these emulsions is neutral and this contributes towards hydrolytic stability.

EXAMPLE V

The filtered product from Example IV was transferred to a two liter round bottom flask equipped with a reflux condenser, a magnetic stirrer, and a heating mantle. 230 grams of absolute ethanol was added to the flask and the mixture was stirred by swirling the flask until a solution resulted. One gram of N,N-diethylhydrolylamine was added and the flask was swirled to mix the amine. Reaction began upon addition of the amine as indicated by significant bubbling. The condenser was placed and stirring was started. Power to the heating mantle was maintained off initially as heat from the reaction continued to build. About four hours later, heat from the reaction began to subside and the heating mantle was turned on to cause a gentle reflux in the flask. Profuse bubbling occurred six hours into the reaction and stopped after eight hours. The excess alcohol was removed using a rotary vacuum evaporator. FTIR analysis of the product revealed the absence of SiH. To 300 grams of this product was added 4 grams of the nonionic surfactant TERGITOL ® TMN-6 and 669 grams of distilled water. The mixture was stirred for 30 minutes and homogenized using a Gaulin laboratory homogenizer to produce an oil in water emulsion having a solids content of about 30 percent by weight. This emulsion was used to treat small 2"×2"×2" concrete blocks and these blocks were tested for water repellency according to Example IV.

EXAMPLE VI

A mixture of methylhydrogen cyclosiloxanes, of the formula $(OSiMeH)_n$ where n=4,5, and 6, was ethoxylated using ethanol and N,N-diethylhydroxylamine according to the procedure described in Example V to produce $(OSiMeOEt)_n$ where n=4,5, and 6. The product was a low viscosity oil and was homogenized with water and surfactant to produce a 30 percent solids nonionic emulsion. This material was tested on concrete blocks using the procedure described above. Table III shows the results of the tests conducted in Examples V and VI. This alternate embodiment of the present invention is of utility where the evolution of hydrogen as a by-product is undesirable.

TABLE III

| | Performance of Water-based Masonry Water Repellent* on Concrete $(OSiMeOEt)_{0.75}/(OSiMeR)_{0.25}$ (30% Solids) | | | | | |
|---|---|---|---|---|---|---|
| | % H$_2$O Exclusion | | | | | |
| R | 1 Day | 2 Days | 5 Days | 11 Days | 15 Days | 21 Days |
| C$_6$H$_{13}$ | 89 | 85 | 53 | 80 | 78 | 75 |
| OEt | 91 | 95 | 86 | 81 | 73 | 74 |

*15% $(OSiMeH)_{0.75}/(OSiMeR)_{0.25}$; 6% TERGITOL ® TMN-6; and 79% H$_2$O.

It will be apparent from the foregoing that many other variations and modifications may be made in the compounds, compositions, structures, and methods described herein without departing substantially from the essential features and concepts of the present invention. Accordingly, it should be clearly understood that the forms of the invention described herein are exemplary only and are not intended as limitations on the scope of the present invention as defined in the appended claims.

What is claimed is:

1. A methylalkoxy-methylalkyl cyclosiloxane copolymer having the formula $$(OSiROR)_d(OSiRR')_e$$

where R is an alkyl radical having one to three carbon atoms; R' is the alkyl radical $(CH_2)_cR$; c is an integer having a value of from one to seventeen; d is an integer having a value of from 3 to 10; and e is an integer having a value of from one to seven.

2. The copolymer of claim 1 in which the integer c has a value of five, six, or seven.

3. The copolymer of claim 1 in which the integer d has a value of three or four.

* * * * *